Patented July 28, 1931

1,816,018

UNITED STATES PATENT OFFICE

CHAUNCEY C. LOOMIS, OF YONKERS, AND HORACE E. STUMP, OF BROOKLYN, NEW YORK, ASSIGNORS, BY MESNE ASSIGNMENTS, TO UNITED STATES RUBBER COMPANY, A CORPORATION OF NEW JERSEY

CONCENTRATION OF LATEX BY CENTRIFUGAL ACTION

No Drawing.     Application filed March 10, 1923.    Serial No. 624,273.

This invention relates to the handling, shipment, and subsequent use of natural latices, as for example; the latices of rubber, gutta percha, balata, etc. As the latex comes from the plant or tree it is of thin milky consistency. It contains a large percentage of water. The presence of this water renders it bulky and costly to ship. In the past this circumstance has required that usually solid rubber, gutta percha or other particles, be coagulated or removed in permanent form incapable of re-emulsifying.

A principal object of the present invention is the reduction of the latex to substantially a solid concentrated condition without the destruction of its ability to emulsify so that water may be added again to it to bring it back toward or to its initial thin consistency or fluidity.

The invention contemplates the provision also, of a concentrated water-dispersible latex and the employment of such a latex for numerous useful purposes, either in its concentrated form or in a form of thinner consistency attained by subsequent dilution. From certain aspects of the invention it is important and from certain other aspects unimportant just how this concentration is attained.

The invention has for a further object the provision of a concentrated water-dispersible latex, the particles of which will be substantially without coagulation and of substantially their original minute individual size and fineness.

A further object of the invention is the provision of the process easily practiced without the requirements of particular skill or the necessity for the employment of delicate tests or complicated or expensive machinery.

A further object of the invention is the provision of a concentrated water-dispersible latex, which having been cheaply and easily produced, is of stable character and capable of sale or purchase at low price.

In accordance with the present invention, the natural latex is first rendered alkaline to the usual indicator, phenolphthalein, by the addition of ammonia or other suitable alkalies, as sodium carbonate, potassium carbonate, sodium hydroxide, potassium hydroxide, etc.

A small amount or modicum of colloidal substances, as glue, gelatine, agar-agar, casein, etc., is or may be next added to act as protective colloids for the solid particles of the material. The fresh latex, thus treated, is then centrifuged. The lighter solid particles gather at the center in the centrifugal action and the water separating out toward the periphery. The concentrated material may be drawn off from the center and the thin material flow from the outer edge. This action may be carried to an extent that the concentrate drawn off is almost, if not quite, of solid form, a thick cream or paste being easily attained. The glue, gelatine, agar-agar, casein, etc., being lighter than the water of the latex materially assists in the centrifuging action, these materials physically carrying the rubber particles to the center of the revolving body material. The protective colloids thus act to provide the concentrate of rubber in a zone or portion of the material. We have discovered that water may be again added to this concentrate at a later time to bring it back to its original consistency, the concentrate itself being easily dispersible in water. The microscopic examination discloses that these actions may be carried on without coagulation or any permanent effect upon the particles of rubber, gutta percha, balata, etc. Such examination also discloses the circumstance that the physical properties and form of the particles of latex are substantially unchanged as a result of the centrifuging.

We are aware that centrifugal action has been employed in the treatment of latex prior to our invention but this has been for the purpose of coagulation and without any thought or function relating to concentration for shipment.

A further and highly important purpose is achieved by this invention in that in removing the water of the latex by centrifugal action a quantity of water soluble impurities, such as mineral matter, shag, etc., is also taken away so that the concentrated material is purer than the natural and this purity prevails when water is added to bring it back to, toward or past its natural consistency.

It is thought that the invention and many of its attendant advantages will be apparent from the foregoing without further description, and it will be manifest that the process and product claimed are subject to wide variation without departing from the spirit and scope of the invention or sacrificing all of its material advantages.

We claim:

1. The process of concentrating latex of rubber, gutta percha, balata and the like, which consists in adding another material to an uncoagulated alkaline latex to prevent coagulation, and centrifuging to recover an uncoagulated concentrated latex.

2. The process of treating latex which comprises adding thereto an alkali and a protective colloid, centrifuging the treated latex, and separating a concentrated uncoagulated water-dispersible product.

3. The process of treating latex which comprises adding thereto ammonia and a protective colloid, centrifuging the treated latex, and separating a concentrated uncoagulated water-dispersible product.

4. The process of treating latex which comprises adding thereto an alkali and an organic protective colloid, centrifuging the treated latex, and separating a concentrated uncoagulated water-dispersible product.

5. The process of treating latex which comprises adding thereto an alkali and an organic protective colloid, centrifuging the treated latex, and separating a concentrated thick creamy uncoagulated water-dispersible product.

6. A concentrated uncoagulated latex derived from a centrifuged alkaline latex containing a protective colloid.

7. As a new composition of matter, an aqueous emulsion of rubber-forming globules derived by concentrating normal fluid latex, said emulsion containing a higher percentage of rubber-forming globules than normal latex, said emulsion containing less than normal percentage of non-rubber forming constituents of normal latex, the emulsion thereby being concentrated and purified, the ratio of rubber-forming globules to non-rubber constituents in the emulsion being predetermined, and the ratio of total solids to water also being predetermined, the emulsion thereby being standardized, the rubber-forming particles in said emulsion being protected against agglomeration by addition of a known amount of anti-coagulant or preservative to the emulsion, whereby said emulsion will, upon dilution with a predetermined amount of water, yield an aqueous emulsion of rubber forming particles, substantially all of the dispersed particles being of about the same order of magnitude as in the original latex and being capable of entering capillaries, which emulsion has the same physical properties as the original latex, save that the rubber concentration therein is known and the diluted emulsion is obtained in a purer state, said concentrated and diluted emulsions being permanent.

8. As a new composition of matter, a concentrated, purified, stable aqueous emulsion of rubber-forming globules derived from normal fluid latex, containing a greater than normal percentage of rubber-forming globules and a less than normal percentage of non-rubber-forming constituents than normal latex, the dispersed rubber globules being of about the same order of magnitude as in the original latex and being capable of entering capillaries and protected against agglomeration by addition to the emulsion of an anti-coagulant or preservative, said concentrated emulsion being capable of dissemination in more water to form a stable diluted emulsion having substantially the same physical properties as the original latex.

9. As a new composition of matter, a concentrated, purified, stable aqueous emulsion of rubber-forming globules derived from normal fluid latex, containing a greater than normal percentage of rubber-forming globules and a less than normal percentage of non-aqueous non-rubber-forming constituents than normal latex, the dispersed rubber globules being of about the same order of magnitude as in the original latex and being capable of entering capillaries and protected against agglomeration by addition to the emulsion of an anti-coagulant or preservative, said concentrated emulsion being capable of dissemination in more water to form a stable diluted emulsion having substantially the same physical properties as the original latex.

CHAUNCEY C. LOOMIS.
HORACE E. STUMP.